(12) United States Patent
Dong et al.

(10) Patent No.: US 11,262,007 B2
(45) Date of Patent: Mar. 1, 2022

(54) FLANGE CONNECTION ASSEMBLY AND THE ASSEMBLY / DISASSEMBLY METHOD THEREOF, PIPING CONNECTION DEVICE AND CHILLER UNIT

(71) Applicant: Carrier Corporation, Palm Beach Gardens, FL (US)

(72) Inventors: Keli Dong, Shanghai (CN); Michael A. Stark, Mooresville, NC (US)

(73) Assignee: CARRIER CORPORATION, Palm Beach Gardens, FL (US)

( * ) Notice: Subject to any disclaimer, the term of this patent is extended or adjusted under 35 U.S.C. 154(b) by 447 days.

(21) Appl. No.: 16/306,391

(22) PCT Filed: May 31, 2017

(86) PCT No.: PCT/US2017/035137
§ 371 (c)(1),
(2) Date: Nov. 30, 2018

(87) PCT Pub. No.: WO2017/210258
PCT Pub. Date: Dec. 7, 2017

(65) Prior Publication Data
US 2020/0318762 A1 Oct. 8, 2020

(30) Foreign Application Priority Data

Jun. 3, 2016 (CN) .......................... 201610385576.3

(51) Int. Cl.
*F16L 23/032* (2006.01)
*F16L 23/22* (2006.01)
*F16L 23/026* (2006.01)

(52) U.S. Cl.
CPC ........... *F16L 23/032* (2013.01); *F16L 23/026* (2013.01); *F16L 23/22* (2013.01)

(58) Field of Classification Search
CPC ........ F16L 23/032; F16L 23/026; F16L 23/22
(Continued)

(56) References Cited

U.S. PATENT DOCUMENTS

| 1,525,647 A | 4/1923 | Haughey |
| 2,443,187 A | 6/1948 | Hobbs |

(Continued)

FOREIGN PATENT DOCUMENTS

| CA | 2154922 A1 | 1/1997 |
| CN | 2593012 Y | 12/2003 |

(Continued)

OTHER PUBLICATIONS

Chinese Office Action for application CN 201610385576.3, dated Mar. 19, 2020, 15 pages.
(Continued)

*Primary Examiner* — Zachary T Dragicevich
(74) *Attorney, Agent, or Firm* — Cantor Colburn LLP

(57) ABSTRACT

A flanged connecting assembly, which comprises: a first flange (210); a second flange (220) with a diameter greater than the diameter of the first flange; and a third flange (230), provided with a first portion (231) and a second portion (232) forming a step; wherein the first portion (231) is fitted to the first flange (210) through a first sealing element (310), and the second portion (232) is fitted to the second flange (220) through a second sealing element (320); and the first flange (210) and the second flange (220) are spaced from each other by a first distance. In this way, a gap formed under the fit of the three flanges can allow a used sealing element to be taken out vie the gap and/or a new sealing element to be assembled in via the gap.

23 Claims, 2 Drawing Sheets

(58) Field of Classification Search
USPC .......................................................... 285/368
See application file for complete search history.

(56) References Cited

U.S. PATENT DOCUMENTS

| | | | | |
|---|---|---|---|---|
| 2,831,708 A | * | 4/1958 | Kircher | ........................ 285/368 |
| 3,761,114 A | | 9/1973 | Blakeley | |
| 3,895,833 A | | 7/1975 | Thiessen | |
| 4,225,161 A | * | 9/1980 | Smith | |
| 4,288,105 A | | 9/1981 | Press | |
| 4,570,701 A | * | 2/1986 | Roberts | ........................ 285/368 |
| 4,573,527 A | | 3/1986 | McDonough | |
| 4,648,631 A | * | 3/1987 | Bryant | ........................ 285/368 |
| 4,699,353 A | | 10/1987 | Weyer | |
| 4,832,379 A | * | 5/1989 | Smith | ........................ 285/368 |
| 5,174,615 A | | 12/1992 | Foster et al. | |
| 5,383,790 A | | 1/1995 | Kerek et al. | |
| 5,437,482 A | | 8/1995 | Curtis | |
| 5,899,507 A | * | 5/1999 | Schroeder | ..................... 285/368 |
| 6,209,927 B1 | * | 4/2001 | Katra | ..................... F16L 23/22 |
| 8,800,310 B2 | | 8/2014 | Sugitani | |
| 9,027,362 B2 | | 5/2015 | Sugitani et al. | |

FOREIGN PATENT DOCUMENTS

| | | |
|---|---|---|
| CN | 201110430 Y | 9/2008 |
| CN | 204239934 U | 4/2015 |
| CN | 204828965 U | 12/2015 |
| CN | 105378295 A | 3/2016 |
| CN | 105378297 A | 3/2016 |
| CN | 105452738 A | 3/2016 |
| DE | 202009018129 U1 | 3/2011 |
| FR | 1535637 A | 8/1968 |
| GB | 843439 A | 8/1960 |
| GB | 1175495 A | 12/1969 |
| WO | 2006120132 A1 | 11/2006 |
| WO | 2015007531 A1 | 1/2015 |

OTHER PUBLICATIONS

International Search Report and Written Opinion for application PCT/US2017/035137, dated Sep. 5, 2017, 13 pages.

* cited by examiner

FLANGE CONNECTION ASSEMBLY AND THE ASSEMBLY / DISASSEMBLY METHOD THEREOF, PIPING CONNECTION DEVICE AND CHILLER UNIT

TECHNICAL FIELD

The present invention relates to the field of pipeline connection, and more specifically, to a flanged connecting assembly which is convenient to maintain and replace.

BACKGROUND ART

Based on the high reliability and connection firmness degree of a flanged connection, the flanged connection is a common connection mode in a pipeline connection, and this is also not exceptional for large cooler units. Generally speaking, in order to increase the tightness of a connection and prevent excessive friction between flanges, gaskets will normally be arranged on end surfaces of a flanged connection. The part is a part which needs to be replaced periodically. For a large cooler unit, when gaskets need to be replaced, a component which is relatively above between the two connected ends of pipelines first needs to be hoisted, so that a certain assembling and disassembling gap exists between the two pipelines. The used gaskets can then be taken out, and new gaskets are assembled in via the assembling and disassembling gap. The hoisted component is then put down, and is fastened by fastening parts, and thereby the whole replacement process is completed.

In this process, on one hand, a lot of time and labor are consumed in the process of hoisting the component; and on the other hand, it is very likely that a customer who has purchased the cooler unit does not have specific hoisting equipment. This brings great inconvenience to both maintenance teams of merchants and customers in terms of equipment maintenance.

SUMMARY OF THE INVENTION

The present invention aims to provide a flanged connecting assembly which is convenient to assemble and disassemble.

The present invention also aims to provide a pipeline connector which is convenient to assemble and disassemble.

The present invention also aims to provide a cooler unit with the flanged connecting assembly which is convenient to assemble and disassemble.

The present invention also aims to provide an assembly and disassembly method for the flanged connecting assembly which is convenient to assemble and disassemble.

According to one aspect of the present invention, provided is a flanged connecting assembly, which comprises: a first flange; a second flange with a diameter greater than the diameter of the first flange; and a third flange with a first portion and a second portion forming a step, wherein the first portion is fitted to the first flange through a first sealing element, and the second portion is fitted to the second flange through a second sealing element; and the first flange and the second flange are spaced from each other by a first distance.

According to another aspect of the present invention, also provided is a pipeline connector, which comprises: a first pipeline, provided with a first flange at one end; a second pipeline, provided with a second flange at one end, the diameter of the second flange being greater than the diameter of the first flange; and a third flange, provided with a first portion and a second portion forming a step, wherein the first portion is fitted to the first flange through a first sealing element, and the second portion is fitted to the second flange through a second sealing element; and the first flange and the second flange are spaced from each other by a first distance.

According to another aspect of the present invention, also provided is a cooler unit, which comprises: a compressor outlet nozzle, provided with a first flange at one end; a condenser inlet nozzle, provided with a second flange at one end, the diameter of the second flange being greater than the diameter of the first flange; and a third flange, provided with a first portion and a second portion forming a step, wherein the first portion is fitted to the first flange through a first sealing element, and the second portion is fitted to the second flange through a second sealing element; and the first flange and the second flange are spaced from each other by a first distance.

According to a further aspect of the present invention, also provided is a method for assembling and disassembling the flanged connecting assembly, which includes: an assembly step: the step sequentially surrounds the first sealing element and the first flange along an axial direction, and the second portion is aligned with the second sealing element and the second flange along the axial direction; the first portion, the first sealing element and the first flange are fastened, and the second portion, the second sealing element and the second flange are fastened; and/or a disassembly step: the fastening of the second portion, the second sealing element and the second flange is released, and the fastening of the first portion, the first sealing element and the first flange is released; and the third flange is moved along the axial direction, so that the second sealing element and/or the second flange can be disassembled and the first sealing element and/or the first flange can be disassembled.

DETAILED DESCRIPTION OF THE INVENTION

Figure 1:
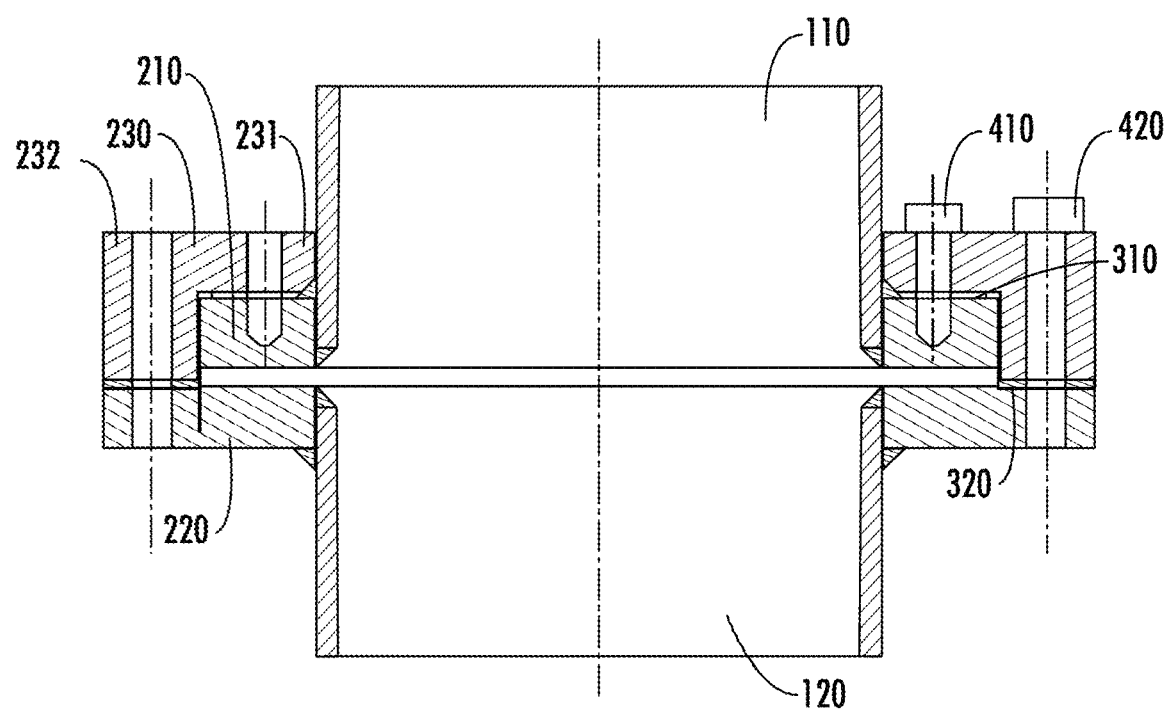
FIG. 1 is a partial schematic diagram of a cooler unit with a flanged connecting assembly of one embodiment of the present invention.

FIG. 1 shows a partial schematic diagram of one embodiment of a cooler unit. The cooler unit comprises: a compressor outlet nozzle 110 connected with a compressor (not shown) and a condenser inlet nozzle 120 connected with a condenser (not shown). A first flange 210 is arranged at the end of the compressor outlet nozzle 110; and a second flange 220 is arranged at the end of the condenser inlet nozzle 120, and the first flange 210 and the second flange 220 are combined and fastened together by a third flange 230 matched to the first flange 210 and the second flange 220. Specifically, the diameter of the second flange 220 is greater than the diameter of the first flange 210; and the third flange 230 is provided with a first portion 231 and a second portion 232 forming a step. In such an arrangement, when the compressor outlet nozzle 110 is butted with the condenser inlet nozzle 120, an annular step is formed between the edge of the first flange 210 and the edge of the second flange 220, and just fits with the first portion 231 and the second portion 232 which form the step of the third flange 230. For example, the specific fitting method can be as follows: the first portion 231 is fitted to the first flange 210 through a first sealing element 310, and the second portion 232 is fitted to the second flange 220 through a second sealing element 320. The plurality of elements are then fastened as a whole by fastening parts. For such a cooler unit, in order for a user or a maintenance team to conveniently replace the various periodically replaced elements, such as the sealing element, without expending too much cost or energy, the step of the third flange 230 can be configured to have a depth greater than the thickness of the first flange 210. Consequently, the first flange 210 and the second flange 220 are spaced from each other by a first distance. In this way, the first distance formed under the fit of the three flanges can allow an used sealing elements to be taken out via the first distance and/or a new sealing elements to be assembled in via the first distance, so that an operation which is carried by an user or the maintenance team to hoist the upper large component to manually produce the first distance can be omitted, and thereby a high degree of convenience is brought to maintenance.

In addition, with regard to the fitting method between the elements in the present solution, a plurality of embodiments are provided together here for reference.

For example, the first flange 210 can be welded around the compressor outlet nozzle 110; and/or the second flange 220 can be welded around the condenser inlet nozzle 120. Specifically, a circle of welding spots can be arranged at the end of the compressor outlet nozzle 110, a circle of welding spots are arranged on the outer wall of the compressor outlet nozzle 110, and thus the first flange 210 can be firmly welded to the compressor outlet nozzle 110. The similar way can also be applied to the connection between the second flange 220 and the condenser inlet nozzle 120.

For another example, the first portion 231 is fitted to the first flange 210 through fastening by blind hole bolts 410. The second portion 232 is fitted to the second flange 220 through fastening by through hole bolts 420. Of course, both can also adopt different fastening methods, or both adopt the same fastening method.

In addition, with regard to each element itself in the present solution, a plurality of embodiments are also provided together here for reference.

Figure 2:
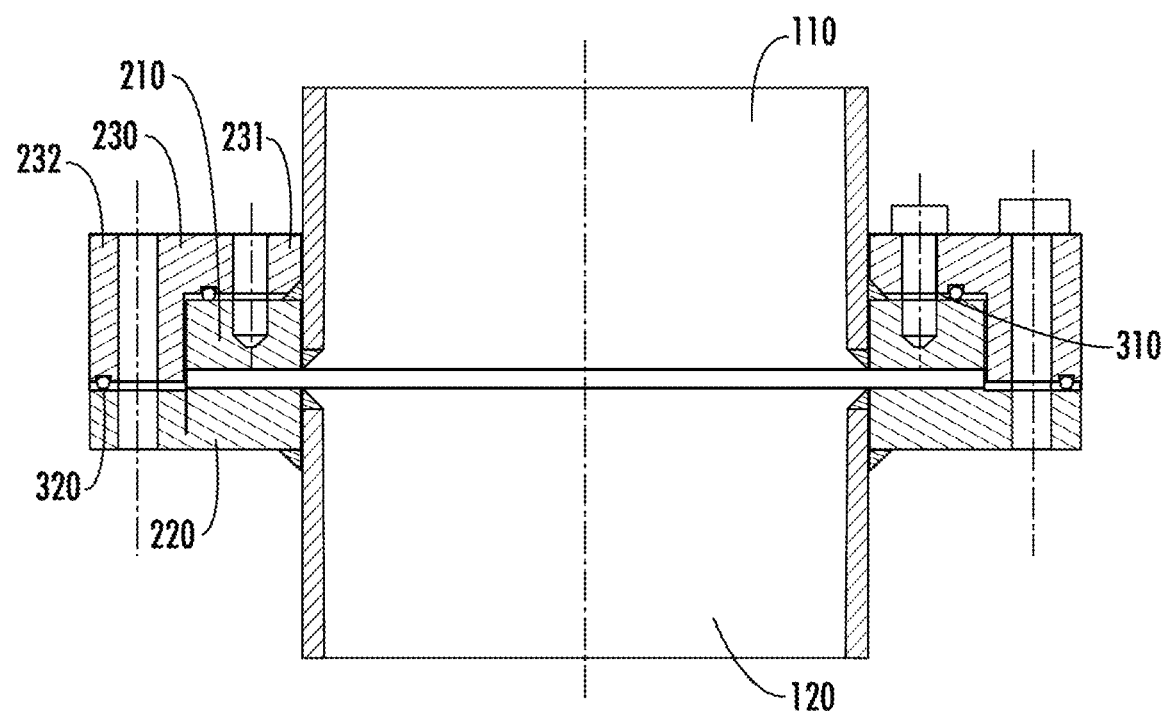
FIG. 2 is a partial schematic diagram of a cooler unit with a flanged connecting assembly of another embodiment of the present invention.

For example, as shown in FIG. 1, the first sealing element 310 and/or the second sealing element 320 adopted therein is a gasket. For another example, as shown in FIG. 2, the first sealing element 310 and/or the second sealing element 320 is an O-shaped ring.

For another example, in order for the first sealing element 310 and/or the second sealing element 320 to be easily assembled in or taken out via the gap of the first distance formed between the first flange 210 and the second flange 220, the thicknesses of both the first sealing element 310 and the second sealing element 320 can be set to be less than or equal to the first distance. For example, as an example, the first distance can be about 10 mm.

For another example, when the first sealing element 310 is assembled to a place between the third flange 230 and the first flange 210, the first sealing element 310 also needs to be stretched in order to ring the first flange 210. Therefore, the first sealing element 310 should be made of an elastic material, and the first sealing element 310 has a flexibility of telescoping between a diameter value of the first flange 210 and a diameter value of the compressor outlet nozzle 110.

For the cooler unit in the present embodiment, after a period of time of operation, when the sealing elements therein need to be replaced due to aging or abrasion, the blind hole bolts 410 and the through hole bolts 420 can be unscrewed, the third flange is moved upward along the axial direction of the compressor outlet nozzle 110, and thereby the used first sealing element 310 and the used second sealing element 320 are exposed. For the used second sealing element 320, because the used second sealing element 320 and the gap of the first distance formed between the first flange 210 and the second flange 220 are on the same plane, the used second sealing element 320 can be directly taken out along the gap, and a new second sealing element 320 is then assembled in. For the used first sealing element 310, since the used first sealing element 310 is arranged between the first flange 210 and the third flange 230, the used first sealing element 310 and the gap of the first distance formed between the first flange 210 and the second flange 220 are not on the same plane. At this point, the first sealing element 310 first needs to be stretched along the axial direction of the compressor outlet nozzle 110 to be greater than or equal to the diameter of the first flange 210, and after passing the first flange 210, the first sealing element 310 is taken out along the gap; the new first sealing element 310 is then assembled in along the gap, and is stretched to be greater than or equal to the diameter of the first flange 210, and after being moved along the axial direction of the compressor outlet nozzle 110 to pass through the first flange 210, the new first sealing element 310 is restored to tightly ring the compressor outlet nozzle 110.

It should be known that the concept of the present invention is not only applied to cooler units. For any type of units which are heavy in weight and still require the periodical assembly, disassembly and maintenance of pipelines or the replacement of elements after being purchased by customers, the concept of the present invention can be applied to solve the technical problem of difficult assembly and disassembly, providing highly-efficient and convenient maintenance.

Therefore, according to another embodiment of the present invention, also provided is a flanged connecting assembly with a wider application range, which comprises: a first flange 210; a second flange 220 with a diameter greater than the diameter of the first flange 210; and a third flange 230, provided with a first portion 231 and a second portion 232 forming a step, wherein the first portion 231 is fitted to the first flange 210 through a first sealing element 310, and the second portion 232 is fitted to the second flange 220 through a second sealing element 320; the depth of the step is greater than the thickness of the first flange 210; and the first flange 210 and the second flange 220 are spaced from each other by a first distance. The flanged connecting assembly is provided with a flange arrangement similar to that in the foregoing cooler unit, but the flanged connecting assembly does not limit components attached to the first flange 210 and the second flange 220. In fact, the first flange 210 and the second flange 220 can be attached to the ends of a variety of different pipelines, and communicate with a third flange 230 to form fit connection, and the three jointly define a needed gap to achieve the technical effect of convenient assembly and disassembly in the present embodiment.

In addition, each element in the flanged connecting assembly has a specific embodiment and a specific connection method similar to or the same as those in the foregoing embodiment, and therefore is not repeated again.

In order to cooperate with the assembly, disassembly and use of the flanged connecting assembly of the present embodiment, also provided here is an embodiment of a method for assembling and disassembling the flanged connecting assembly. The method includes: an assembly step: a step of a third flange 230 sequentially surrounds a first sealing element 310 and a first flange 210 along an axial direction, and a second portion 232 of the third flange 230 is aligned with a second sealing element 320 and a second flange 220 along the axial direction; a first portion 231 of the third flange 230, the first sealing element 310 and the first flange 210 are fastened, and the second portion 232 of the third flange 230, the second sealing element 320 and the second flange 220 are fastened; and a disassembly step: the fastening of the second portion 232 of the third flange 230, the second sealing element 320 and the second flange 220 is released, and the fastening of the first portion 231 of the third flange 230, the first sealing element 310 and the first flange 210 is released; and the third flange 230 is moved along the axial direction, so that the second sealing element 320 and/or the second flange 220 can be disassembled and the first sealing element 310 and/or the first flange 210 can be disassembled.

Further, when the sealing elements in the flanged connecting assembly need to be replaced, the method further includes: a replacement and disassembly step: the fastening of the second portion 232 of the third flange 230, the used second sealing element 320 and the second flange 220 is released, and the fastening of the first portion 231 of the third flange 230, the used first sealing element 310 and the first flange 210 is released; and the third flange 230 is moved along the axial direction, so that the used second sealing element 320 and the used first sealing element 310 can be disassembled; and a replacement and assembly step: the step of the third flange 230 sequentially surrounds a new first sealing element 310 and the first flange 210 along the axial direction, and the second portion 232 of the third flange 230 is aligned with a new second sealing element 320 and the second flange 220 along the axial direction; the first portion 231 of the third flange 230, the first sealing element 310 and the first flange 210 are fastened, and the second portion 232 of the third flange 230, the second sealing element 320 and the second flange 220 are fastened. Specifically, the used second sealing element 320 and the used first sealing element 310 are disassembled via the gap of a first distance formed between the first flange 210 and the second flange 220; and/or a new second sealing element 320 and a new first sealing element 310 are assembled in via the gap of the first distance formed between the first flange 210 and the second flange 220.

Also provided here is a pipeline connector as an application embodiment of the flanged connecting assembly in the foregoing embodiment, which comprises: a first pipeline, provided with a first flange 210 at one end; a second pipeline, provided with a second flange 220 at one end, the diameter of the second flange 220 being greater than the diameter of the first flange 210; and a third flange 230, provided with a first portion 231 and a second portion 232 forming a step, wherein the first portion 231 is fitted to the first flange 210 through a first sealing element 310, and the second portion 232 is fitted to the second flange 220 through a second sealing element 320; the depth of the step is greater than the thickness of the first flange 210; and the first flange 210 and the second flange 220 are spaced from each other by a first distance.

Each element in the pipeline connector also has a specific embodiment and a specific connection method similar to or the same as those in the foregoing embodiment, and therefore is not repeated again.

The above-mentioned examples mainly describe the flanged connecting assembly, the assembly and disassembly method thereof, the pipeline connector and the cooler unit in the present invention. Although only some of the embodiments of the present invention are described, a person skilled in the art should understand that the present invention can be implemented in many other forms without departing from its main idea and scope. Therefore, the presented examples and embodiments are regarded as being exemplary rather than limitary, and without departing from the spirit and scope of the present invention defined by each attached claim, the present invention may cover various modifications and replacements.

The invention claimed is:

1. A flanged connecting assembly, characterized by comprising:
a first flange;
a second flange with a diameter greater than the diameter of the first flange; and
a third flange, provided with a first portion and a second portion forming a step;
wherein the first portion is fitted to the first flange through a first sealing element, and the second portion is fitted to the second flange through a second sealing element; and the first flange and the second flange are spaced from each other by a first distance;
wherein the first flange is positioned between the third flange and the second flange;
characterized in that the first portion is fitted to the first flange through fastening by blind hole bolts and/or the second portion is fitted to the second flange through fastening by through hole bolts.

2. The flanged connecting assembly according to claim 1, characterized in that the first sealing element and/or the second sealing element is a gasket.

3. The flanged connecting assembly according to claim 1, characterized in that the first sealing element and/or the second sealing element is an O-shaped ring.

4. The flanged connecting assembly according to claim 1, characterized in that the thicknesses of the first sealing element and/or the second sealing element is less than or equal to the first distance.

5. The flanged connecting assembly according to claim 1, characterized in that the depth of the step is greater than the thickness of the first flange.

6. The flanged connecting assembly according to claim 1, wherein the second flange has an outer diameter greater than an outer diameter of the first flange.

7. A pipeline connector, characterized by comprising:
a first pipeline, provided with a first flange at one end;
a second pipeline, provided with a second flange at one end, the diameter of the second flange being greater than the diameter of the first flange; and
a third flange, provided with a first portion and a second portion forming a step;
wherein the first portion is fitted to the first flange through a first sealing element, and the second portion is fitted to the second flange through a second sealing element; and the first flange and the second flange are spaced from each other by a first distance;
wherein the first flange is positioned between the third flange and the second flange;
characterized in that the first portion is fitted to the first flange through fastening by blind hole bolts and/or the second portion is fitted to the second flange through fastening by through hole bolts.

8. The pipeline connector according to claim 7, characterized in that the first flange is welded around the first pipeline; and/or the second flange is welded around the second pipeline.

9. The pipeline connector according to claim 7, characterized in that the first sealing element and/or the second sealing element is a gasket.

10. The pipeline connector according to claim 7, characterized in that the first sealing element and/or the second sealing element is an O-shaped ring.

11. The pipeline connector according to claim 7, characterized in that the thicknesses of the first sealing element and/or the second sealing element is less than or equal to the first distance.

12. The pipeline connector according to claim 7, characterized in that the first sealing element is made of an elastic material, and the first sealing element has a flexibility of telescoping between a diameter value of the first flange and a diameter value of the first pipeline.

13. The pipeline connector according to claim 7, characterized in that the depth of the step is greater than the thickness of the first flange.

14. A cooler unit, characterized by comprising:
a flanged connecting assembly of claim 1;
a compressor outlet nozzle, provided with the first flange at one end;
a condenser inlet nozzle, provided with the second flange at one end.

15. The cooler unit according to claim 14, characterized in that the first flange is welded around the compressor outlet nozzle; and/or the second flange is welded around the condenser inlet nozzle.

16. The cooler unit according to claim 14, characterized in that the first sealing element and/or the second sealing element is a gasket.

17. The cooler unit according to claim 14, characterized in that the first sealing element and/or the second sealing element is an O-shaped ring.

18. The cooler unit according to claim 14, characterized in that the thicknesses of the first sealing element and/or the second sealing element is less than or equal to the first distance.

19. The cooler unit according to claim 14, characterized in that the first sealing element is made of an elastic material, and the first sealing element has a flexibility of telescoping between a diameter value of the first flange and a diameter value of the compressor outlet nozzle.

20. The cooler unit according to claim 14, characterized in that the depth of the step is greater than the thickness of the first flange.

21. A method for assembling and disassembling the flanged connecting assembly according to claim 1, characterized by comprising:
an assembly step: the step sequentially surrounds the first sealing element and the first flange along an axial direction, and the second portion is aligned with the second sealing element and the second flange along the axial direction; the first portion, the first sealing element and the first flange are fastened, and the second portion, the second sealing element and the second flange are fastened; and/or
a disassembly step: the fastening of the second portion, the second sealing element and the second flange is released, and the fastening of the first portion, the first sealing element and the first flange is released; and the third flange is moved along the axial direction, so that the second sealing element and/or the second flange can be disassembled and the first sealing element and/or the first flange can be disassembled.

22. The method for assembling and disassembling the flanged connecting assembly according to claim 21, characterized by comprising:
a replacement and disassembly step: the fastening of the second portion, the used second sealing element and the second flange is released, and the fastening of the first portion, the used first sealing element and the first flange is released; and the third flange is moved along the axial direction, so that the used second sealing element and the used first sealing element can be disassembled; and
a replacement and assembly step: the step sequentially surrounds a new first sealing element and the first flange along the axial direction, and the second portion is aligned with a new second sealing element and the second flange along the axial direction; the first portion, the first sealing element and the first flange are fastened, and the second portion, the second sealing element and the second flange are fastened.

23. The method for assembling and disassembling the flanged connecting assembly according to claim 21, characterized in that the used second sealing element and the used first sealing element are disassembled via a first distance of spacing between the first flange and the second flange; and/or the new second sealing element and the new first sealing element are assembled in via the first distance of spacing between the first flange and the second flange.

* * * * *